(12) United States Patent
Kito et al.

(10) Patent No.: US 10,294,991 B2
(45) Date of Patent: May 21, 2019

(54) LINEAR MOTION GUIDE UNIT

(71) Applicant: NIPPON THOMPSON CO., LTD., Tokyo (JP)

(72) Inventors: Kunihiko Kito, Mino (JP); Kentaro Narita, Mino (JP); Masaharu Yoshida, Tokyo (JP)

(73) Assignee: NIPPON THOMPSON CO., LTD., Tokyo (JP)

( * ) Notice: Subject to any disclaimer, the term of this patent is extended or adjusted under 35 U.S.C. 154(b) by 0 days.

(21) Appl. No.: 15/903,191

(22) Filed: Feb. 23, 2018

(65) Prior Publication Data

US 2018/0245633 A1 Aug. 30, 2018

(51) Int. Cl.
*F16C 29/06* (2006.01)

(52) U.S. Cl.
CPC .................. *F16C 29/065* (2013.01)

(58) Field of Classification Search
CPC .......... F16C 29/005; F16C 29/0602; F16C 29/0609; F16C 29/065; F16C 29/0666
See application file for complete search history.

(56) References Cited

U.S. PATENT DOCUMENTS

| | | | | |
|---|---|---|---|---|
| 6,390,679 B1 * | 5/2002 | Kashiwagi | .......... | F16C 29/0609 384/44 |
| 7,645,072 B2 * | 1/2010 | Shimizu | .................. | F16C 29/04 384/44 |
| 7,677,804 B2 * | 3/2010 | Geka | .................. | F16C 29/0604 384/43 |
| 7,771,119 B2 * | 8/2010 | Mizumura | .......... | F16C 29/0604 384/45 |
| 8,033,730 B2 * | 10/2011 | Kakei | .................. | F16C 29/065 384/44 |
| 2001/0008568 A1 * | 7/2001 | Kasuga | ............... | F16C 29/0609 384/45 |
| 2005/0157962 A1 * | 7/2005 | Matsumoto | ............. | F16C 29/06 384/44 |
| 2005/0213856 A1 * | 9/2005 | Geka | .................... | F16C 29/0604 384/45 |
| 2006/0034552 A1 * | 2/2006 | Nakano | ............... | F16C 29/0604 384/45 |

FOREIGN PATENT DOCUMENTS

| | | |
|---|---|---|
| JP | 2002155936 A | 5/2002 |
| JP | 2005273765 A | 10/2005 |
| JP | 2008133837 A | 6/2008 |
| JP | 2015197173 A | 11/2015 |

* cited by examiner

*Primary Examiner* — Phillip A Johnson
(74) *Attorney, Agent, or Firm* — Browdy and Neimark, PLLC

(57) ABSTRACT

A linear motion guide unit prevents damage to a corner portion of an end surface of a carriage resulting from high-speed rolling of the rolling elements, and eliminates the need for strict dimensional management of facing end surfaces of the carriage and a spacer. A crowning is formed at an end portion of the carriage, and an R chamfered portion is formed at a corner of an end surface of the carriage. An R chamfered portion is formed at a corner of the end surface of the spacer. The R chamfered portions define a valley portion between the facing surfaces of the carriage and the spacer. The rolling elements roll above the valley portion while striding it to thereby be prevented from colliding against the corner portion of the end surface of the carriage, whereby damage to the corner portion of the end surface of the carriage can be prevented.

7 Claims, 12 Drawing Sheets

LINEAR MOTION GUIDE UNIT

FIELD OF THE INVENTION

The present invention relates to a linear motion guide unit composed of a guide rail having raceway grooves, and a slider moving at high speed on the guide rail via rolling elements.

BACKGROUND OF THE INVENTION

In a conventionally known linear motion guide unit, rolling elements circulate through a circulation passage of a slider. In such a linear motion guide unit, in order for the rolling elements to smoothly enter or exit from a load-carrying race formed by a raceway groove of a carriage of the slider, gently sloped crownings are formed in regions of opposite ends of the raceway groove of the carriage, the opposite ends of the raceway groove being inlet portions; i.e., mouths, of the load-carrying race. The crownings are linear or curved inclined surfaces formed at opposite end portions of the raceway surface of the raceway groove of the carriage. In the linear motion guide unit, at a connection portion of the carriage to an end cap between the load-carrying race and a turnaround passage, a linear or curved chamfered portion is formed on an end surface of the carriage, the end surface extending from the crowning toward an inner circumferential portion of the turnaround passage formed in the end cap; i.e., the chamfered portion is provided at a distal end portion of the crowning.

According to a known guide apparatus, in order to achieve high-speed motion of a slider on a guide rail, a snag is removed from a course of the rolling elements which roll from a no-load area into a load area, thereby lowering sliding resistance and noise in the case of a high-speed relative motion between the slider and the guide rail. In the guide apparatus, a load-carrying rolling-element rolling groove has crowning areas at respective opposite ends of the load area; as the load-carrying rolling-element rolling groove and a rolling-element rolling groove approach a turnaround passage, the distance between the load-carrying rolling-element rolling groove and the rolling-element rolling groove gradually increases such that an edge portion of a load-carrying rolling-element rolling surface is recessed downward in relation to the inner side wall surface of the turnaround passage to thereby form a step portion; as a result, even in the presence of a dimensional error in forming a guide portion and in forming the load-carrying rolling-element rolling groove, the surface of the load-carrying rolling-element rolling groove does not protrude toward the guide rail in relation to the side wall surface of the turnaround passage; and the size of the step portion in relation to an end cap of a carriage is about 5% of the rolling-element diameter (see, for example, Japanese Patent Application Laid-Open No. 2002-155936).

A known linear motion guide unit includes a guide rail which has a rail-side rolling-element raceway groove formed therein along an axial direction, and a slider body which has a slider-side rolling-element raceway groove formed therein and facing the rail-side rolling-element raceway groove and can move in the axial direction via a plurality of rolling elements disposed in a rolling-element rolling passage composed of the rail-side rolling-element raceway groove and the slider-side rolling-element raceway groove. In the linear motion guide unit, the slider-side rolling-element raceway groove is partially formed of a first crowning, a second crowning sloped more steeply than the first crowning, and a sloped surface sloped more steeply than the second crowning, and an intersection point of an imaginary line extending linearly along the second crowning and an imaginary linear line extending along an end surface of the slider body coincides with an intersection point of an imaginary line extending arcuately along the outer circumference of an inner circumferential guide member which serves as the inner circumferential surface of a turnaround passage, and an imaginary line extending linearly along the end surface of the slider body (see, for example, Japanese Patent Application Laid-Open No. 2008-133837).

A linear motion guide unit which exhibits low noise and operates well has been known. In the linear motion guide unit, a groove of a return guide and a raceway groove of a slider are not smoothly connected at their connection portion, but a level difference is formed therebetween. At a bottom portion and its vicinity of the raceway groove of the slider, the surface of the raceway groove of the slider is located toward the center of curvature of the raceway groove of the slider with respect to the surface of the groove of the return guide, whereas at a shoulder portion and its vicinity of the raceway groove of the slider, the surface of the groove of the return guide is located toward the center of curvature of the raceway groove of the slider with respect to the surface of the raceway groove of the slider (see, for example, Japanese Patent Application Laid-Open No. 2015-197173).

There has been known a linear motion guide unit which has standard specifications for allowing use in wide applications, allowing easy formation of crowning, having a small crowning depth as compared with conventional linear motion guide units, and exhibiting high precision and durability. In the linear motion guide unit, at gateways to a raceway groove of a carriage, which raceway groove forms a load-carrying race, there are formed respective crownings having the form of gently curved surfaces for allowing rolling elements to smoothly enter and exit from the load-carrying race, and R chamfered portions in the form of curved surfaces formed at respective opposite ends of the raceway groove. The crownings and the corresponding R chamfered portions are connected continuously without formation of a corner portion (see, for example, Japanese Patent Application Laid-Open No. 2005-273765).

Meanwhile, the linear motion guide unit disclosed in the above Japanese Patent Application Laid-Open No. 2008-133837 relates to a reduction of sliding resistance and noise in high-speed motion and has a step portion such that a load-carrying rolling-element rolling surface is lower than a spacer inner circumferential surface used to form the turnaround passage of the slider. Therefore, in such a linear motion guide unit in which rolling elements are not retained by a retainer, the rolling elements collide against the step portion at a corner portion of an end surface of a spacer when the rolling elements roll into the turnaround passage from the load-carrying race. Also, the linear motion guide unit disclosed in the above Japanese Patent Application Laid-Open No. 2008-133837 intends to improve durability in high-speed running and is configured such that the rolling-element raceway groove of the slider has the first crownings, the second crownings, and the sloped surfaces at respective opposite end portions thereof and such that an intersection point of the slider end surface and an extension line of the second crowning coincides with an intersection point of the slider end surface and an extension line of a return guide; i.e., an extension line of the spacer inner circumferential surface. Therefore, in the linear motion guide unit, since a connection portion of the second crowning and the sloped surface protrudes from the return guide, exfoliation or flaking may occur as a result of rolling elements repeatedly colliding at high speed against the connection portion; further, since the two crownings must be formed by mechanical grinding, and the connection portion must be manually finished for R chamfering, a manufacturing process consumes time and labor, potentially resulting in an increase in cost.

The linear motion guide unit disclosed in the above Japanese Patent Application Laid-Open No. 2015-197173, which exhibits low noise and operates well, is configured such that regarding the positional relation between the surface of the raceway groove of the slider and the surface of the groove of the return guide, at a bottom portion and its vicinity of the raceway groove, the slider's raceway groove surface protrudes toward the center of the raceway groove, whereas at a shoulder portion other than the bottom portion and its vicinity of the raceway groove, the return guide's groove surface protrudes toward the center of the raceway groove. In the linear motion guide unit, since the bottom portion and its vicinity of the raceway groove of the slider protrude toward the center of the raceway groove as compared with the return guide, when rolling element move at high speed toward a rolling element rolling passage from the turnaround passage in high-speed motion, the rolling elements repeatedly collide against the protruding portion at an end portion of the raceway groove of the slider, potentially resulting in damage to the protruding portion.

The linear motion guide unit disclosed in the above Japanese Patent Application Laid-Open No. 2005-273765 exhibits high precision and durability and is configured such that the raceway groove of the carriage has crownings and R chamfered portions formed at respective opposite ends thereof and such that the crownings and the R chamfered portions are connected continuously without formation of a corner portion. In the linear motion guide unit, since the position of the spacer in relation to the raceway groove of the carriage changes within a dimensional tolerance, in the case where the carriage is higher than the spacer, rolling elements repeatedly collide at high speed against an end portion of the carriage, potentially resulting in damage to the end portion; in contrast, in the case where the spacer is higher than the carriage, the rolling elements may possibly be snagged by an end portion of the spacer. In a conventional linear motion guide unit, a slider slides at high speed on a guide rail in a reciprocating manner via a plurality of rolling elements, or rolling elements, rolling on the guide rail; the slider includes a carriage and end caps disposed on respective opposite end surfaces of the carriage; and when the rolling elements move in a relatively reciprocating manner, the rolling elements collide against a corner portion of the carriage, potentially resulting in damage to the corner portion of the carriage.

SUMMARY OF THE INVENTION

The present invention has been conceived to solve the above problems, and an object of the present invention is to provide an improved linear motion guide unit which can prevent damage to an end of a carriage resulting from collision of rolling elements against an end surface of the carriage even in the case of a slider sliding at high speed in relation to a guide rail. In the improved linear motion guide unit, at least a chamfered portion is formed at a corner portion of an end surface of a spacer of an end cap, which end surface faces an end surface of the carriage, and R chamfered portions sloped more steeply than crownings are formed in respective regions of opposite ends of the carriage. When rolling elements roll in a circulation passage of the slider from a load-carrying race toward a turnaround passage as a result of sliding of the slider in relation to the guide rail, at opposite ends of a raceway groove of the carriage, the rolling elements move linearly at high speed at all times in crowning regions in which the load imposed on the rolling elements is gradually removed. In such a case, the rolling elements pass above valley portions formed between the chamfered portions of the spacers and the R chamfered portions of the carriage by the action of an inertial force. As a result, there can be restrained damage to end surface portions of the carriage, which could otherwise result from the rolling elements rolling at high speed. Further, in the linear motion guide unit, when the rolling elements move at such a low speed as possibly not to move linearly, the rolling elements roll above the valley portions while striding them (in a bridging manner). In this case, since the rolling elements roll at low speed and since an impact force is small even in the event of collision of the rolling elements against the corner portions of the end surfaces of the carriage, there can be restrained damage to the end surface portions of the carriage, which could otherwise result from collision of the rolling elements.

Means to Solve the Problems

The present invention provides a linear motion guide unit comprising a guide rail and a slider. The guide rail has a first raceway groove extending along a longitudinal direction. The slider has a second raceway groove facing the first raceway groove and slides in relation to the guide rail via a plurality of rolling elements serving as rolling elements and rolling in a load-carrying race composed of the first raceway groove and the second raceway groove. The slider has a carriage in which the second raceway groove and a return passage extending in parallel with the second raceway groove are formed, and end caps which are disposed in close contact with respective opposite end surfaces of the carriage and in which arc turnaround passages are formed respectively and establish communication between the load-carrying race and the return passage. Each of the end caps comprises an end cap body which forms an outer circumferential surface of the turnaround passage, and a spacer which is disposed in a recess of the end cap body and forms an inner circumferential surface of the turnaround passage. Crownings are formed at respective opposite ends of the second raceway groove of the carriage and each have the form of a curved surface gently curved toward the turnaround passage.

At least a chamfered portion is formed at a corner portion of an end surface of the spacer, which end surface faces the end surface of the carriage. On a distal end side of each of the crownings, the carriage has an R chamfered portion sloped more steeply than the crowning, and the crowning and the R chamfered portion are connected continuously without formation of a corner portion. The chamfered portion of the spacer and the R chamfered portion of the carriage define a valley portion between mutually facing surfaces of the carriage and the slider. The rolling elements roll above the valley portion while striding the valley portion.

An intersection point of an imaginary line extending along the inner circumferential surface of the turnaround passage of the spacer and an imaginary line extending along the end surface of the spacer is located in a region higher than a corner portion of the end surface of the carriage.

Further, a top of the chamfered portion of the spacer is located in a region lower than the corner portion of the end surface of the carriage.

In another case, a top of the chamfered portion of the spacer is located in a region higher than an intersection point of an extension line of the crowning of the carriage and an extension line of the end surface of the carriage.

In still another case, a top of the chamfered portion of the spacer is located within a range from an intersection point of an extension line of the crowning of the carriage and an extension line of the end surface of the carriage to a corner portion of the end surface of the carriage. The chamfered portion of the spacer is an R chamfered portion.

In the linear motion guide unit, the crownings of the carriage are finished by grinding, and the R chamfered portions of the carriage are mirror-finished by use of polishing tape.

Effects of the Invention

In the linear motion guide unit according to the present invention, as mentioned above, the valley portion is formed between the facing surfaces of the R chamfered portion of the carriage and the chamfered portion of the spacer. In relative reciprocating movement of the rolling elements, or rolling elements, within the slider as a result of relative reciprocating sliding of the slider on the guide rail, in the case where the rolling elements roll in the circulation passage from the load-carrying race to the turnaround passage at such a high speed that the rolling elements move linearly at all times over a crowning of the carriage by the action of an inertial force, the rolling elements pass above the valley portion, whereby the collision of the rolling elements against an end surface portion of the carriage can be prevented. In the case where the rolling elements roll free from the action of an inertial force, since the rolling elements roll in a bridging manner above the valley portion formed between the chamfered portion of the spacer and the crowning or the following R chamfered portion of the carriage, the rolling elements are unlikely to collide against an end surface portion of the carriage. Even in the event of collision of the rolling elements against an end surface portion of the carriage, since the rolling elements are rolling at low speed, an impact force is small. Therefore, the rolling elements do not collide against an end surface portion of the carriage; even in the event of collision, since the impact force is small, damage to the carriage can be prevented even though the end surface of the carriage is exposed. Also, since the valley portion is formed between the end surface portions of the carriage and the spacer, and the rolling elements roll above the valley portion in a bridging manner, a dimensional tolerance can be increased for the spacer position in relation to the raceway groove of the carriage; i.e., the need for strict dimensional management can be eliminated, whereby manufacturing cost can be reduced. That is, in the present linear motion guide unit, an end surface portion of the carriage (an end portion of the raceway groove thereof) faces the spacer so as to prevent the rolling elements, or the rolling elements, from colliding against the end surface portion of the carriage, thereby restraining damage to the carriage, which could otherwise result from repeated collision of the rolling elements. Also, the R chamfered portion of the carriage is mirror-finished so as to exhibit surface roughness equivalent to or lower than that of the raceway groove, and the mirror-finished surface receives colliding rolling elements. Further, the R chamfered portion has a convexly curved section taken along the longitudinal direction of the raceway groove; the raceway groove has a semicircularly curved section taken perpendicularly to the longitudinal direction thereof; and thus, the R chamfered portion is greater in rolling element contact area than a corner portion of the end surface portion of the carriage. As a result, contact pressure in the event of collision of a rolling element is lowered, thereby restraining damage. Further, in the present linear motion guide unit, the R chamfered portion is provided at a load-carrying-race-side end portion of the spacer such that the rolling elements are unlikely to be snagged by the end portion of the spacer, whereby the rolling elements can smoothly roll and circulate in the circulation passage. When the rolling elements roll from the load-carrying race to the turnaround passage as a result of relative sliding of the slider, and roll at such a low speed as possibly not to move linearly over the crowning by the action of an inertial force, the rolling elements may possibly roll in contact with the spacer. However, since the R chamfered portion is provided at the load-carrying-race-side end portion of the spacer, a rolling element contact area can be increased in the event of collision of the rolling elements, whereby damage to the end portion of the spacer can also be restrained. The present invention can provide a linear motion guide unit for use in high-speed applications at low cost by means of minor design change of mass-produced parts; specifically, mere chamfering of a corner portion of a load-carrying-race-side end portion of the spacer.

BRIEF DESCRIPTION OF THE DRAWINGS

FIG. 6 is a set of sectional views of the carriage of FIG. 5 and the spacer partially constituting an end cap taken along the direction of a contact angle, showing, on an enlarged scale, a first embodiment in which an R chamfered portion is formed at a corner portion of the end surface of the carriage, and an R chamfered portion is formed at a corner portion of the spacer, wherein

FIG. 7 is a set of sectional views of the carriage of FIG. 5 and the spacer partially constituting the end cap taken along the direction of a contact angle, showing, on an enlarged scale, a second embodiment in which an R chamfered portion is formed at a corner portion of the end surface of the carriage, and a chamfered portion in the form of an oblique cut is formed at a corner portion of the spacer, wherein

FIG. 8 is a set of enlarged views showing a third embodiment in which the end cap is disposed on the carriage such that a top of the R chamfered portion of the spacer is located at a position higher than an intersection point of an extension line of the crowning of the carriage and an extension line of the end surface of the carriage, wherein

FIG. 9 is a set of enlarged views showing a fourth embodiment in which the end cap is disposed on the carriage such that the top of the R chamfered portion of the spacer is located at the same position as that of the intersection point of the extension line of the crowning of the carriage and the extension line of the end surface of the carriage, wherein FIG. 8A is an explanatory view showing, on a further enlarged scale, a state that possibly arises when the rolling element rolls from the turnaround passage to the load-carrying race;

FIG. 10 is a set of enlarged views showing a fifth embodiment in which the end cap is disposed on the carriage such that the top of the R chamfered portion of the spacer is located within a range from the intersection point of the extension line of the crowning of the carriage and the extension line of the end surface of the carriage to a corner portion of the R chamfered portion of the carriage, wherein

FIG. 11 is a set of enlarged views showing a sixth embodiment in which the end cap is disposed on the carriage such that the top of the R chamfered portion of the spacer is located at the same position as that of the corner portion of the R chamfered portion of the carriage and such that an extension line of an inner circumferential surface of the spacer is located higher than the position of the corner portion, wherein

FIG. 12 is a set of enlarged views showing a seventh embodiment in which the end cap is disposed on the carriage such that the top of the R chamfered portion of the spacer is located lower than the position of the corner portion of the R chamfered portion of the carriage and such that the extension line of the inner circumferential surface of the spacer is located in a region higher than the position of the corner portion, wherein

DETAILED DESCRIPTION OF THE EMBODIMENTS

The linear motion guide unit according to the present invention is used in various types of apparatus having a relative sliding member, such as machine tools, semiconductor fabrication systems, and precision measuring apparatus, and can exhibit high precision (specifically, high running precision), and high durability in high-speed and high-acceleration/deceleration applications so as to meet recent requirements.

Figure 1:
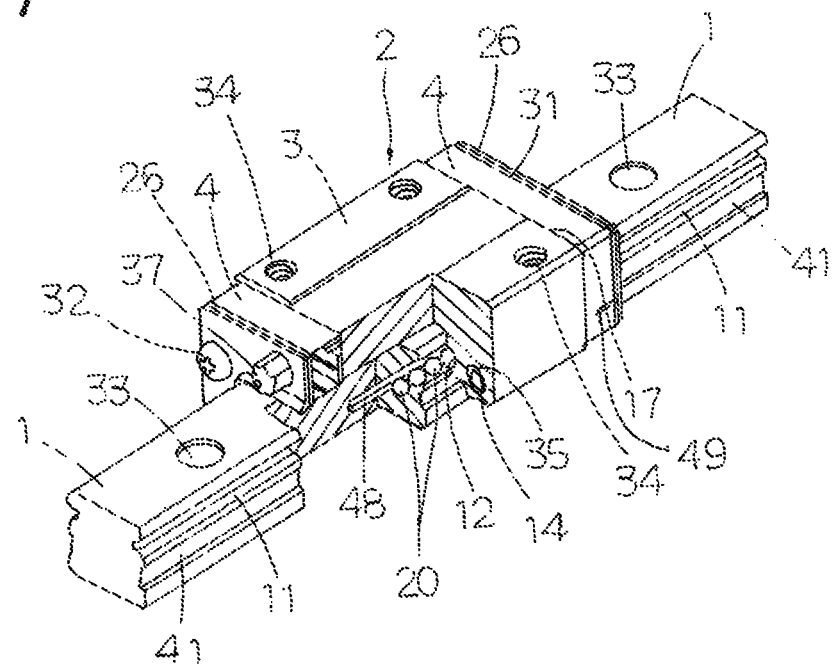
FIG. 1 is a partially sectional perspective view showing an embodiment of a linear motion guide unit according to the present invention.
Figure 13:
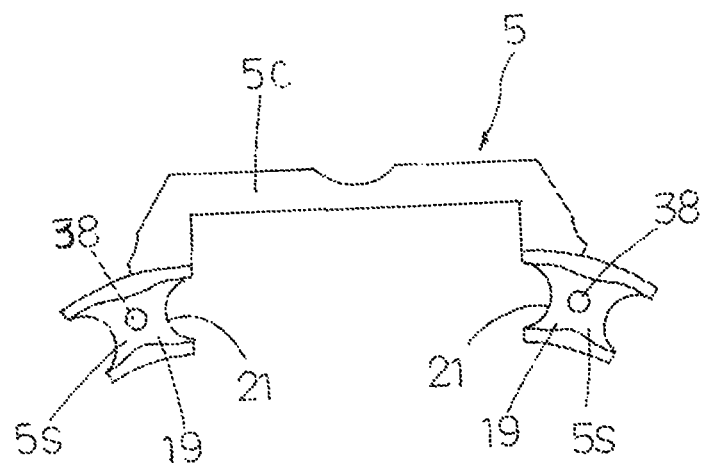
FIG. 13 is a front view showing the spacer which partially constitutes the end cap in the linear motion guide unit.
Figure 15:
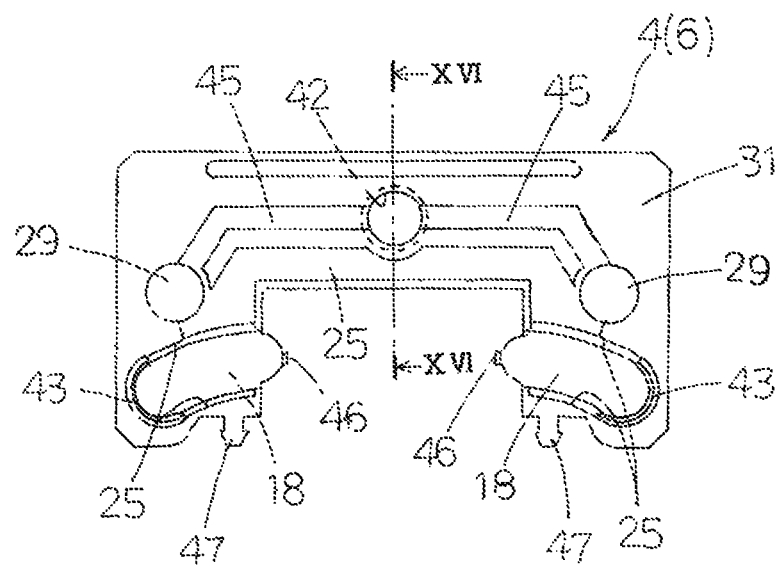
FIG. 15 is a front view showing an end cap body which partially constitutes the end cap in the linear motion guide unit.

Embodiments of the linear motion guide unit according to the present invention will next be described with reference to the drawings. As shown in FIG. 1, the linear motion guide unit of the present invention generally includes a guide rail 1 having raceway grooves 11 (first raceway grooves) formed therein along longitudinal sides 41, and a slider 2 having raceway grooves 12 (second raceway grooves) facing the raceway grooves 11 of the guide rail 1, and sliding in relation to the guide rail 1 via a plurality of rolling elements 20, or rolling elements, rolling in load-carrying races 13 composed of the raceway grooves 11 and the raceway grooves 12. The slider 2 includes a carriage 3 having the raceway grooves 12 and return passages 14 extending in parallel with the raceway grooves 12; end caps 4 disposed in close contact with respective opposite end surfaces 17 of the carriage 3 and each having arc turnaround passages 15 which establish communication between the load-carrying races 13 and the return passages 14; and end seals 26 disposed on respective end surfaces of the end caps 4. Each of the end caps 4 is composed of an end cap body 6 (FIG. 15) having outer circumferential surfaces 18 of the turnaround passages 15, and a spacer 5 (FIG. 13) which is disposed in a recess 25 of the end cap body 6 and has inner circumferential surfaces 19 of the turnaround passages 15. As a result of relative sliding movement of the slider 2, the rolling elements 20 roll in circulation passages each composed of the load-carrying race 13 composed of the raceway groove 11 of the guide rail 1 and the raceway groove 12 of the carriage 3, the return passage 14 formed in the carriage 3, and a pair of the turnaround passages 15 formed in the end caps 4.

Figure 2:
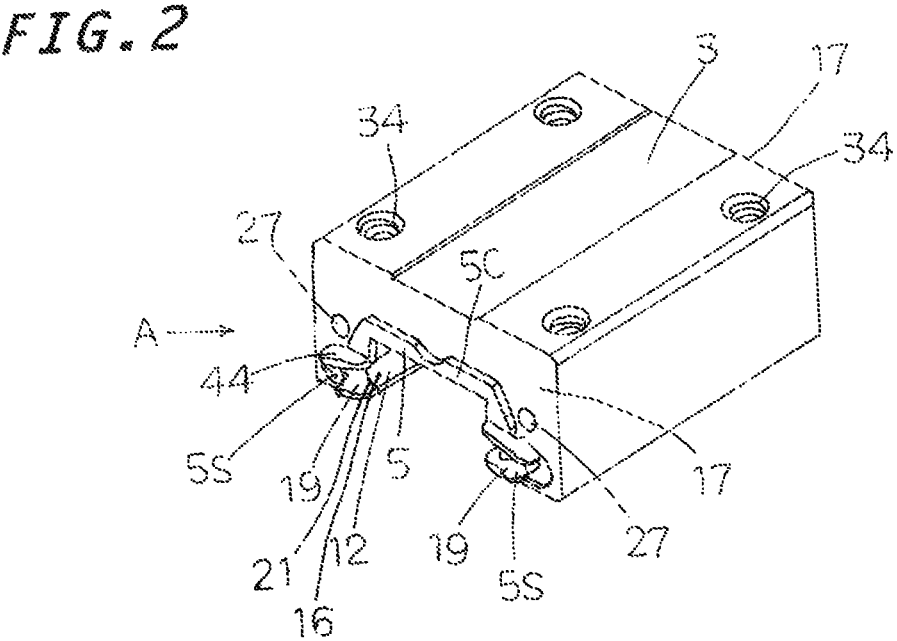
FIG. 2 is a perspective view showing a carriage which is a constituent member of the linear motion guide unit of FIG. 1, and a spacer attached to an end surface of the carriage.
Figure 14:
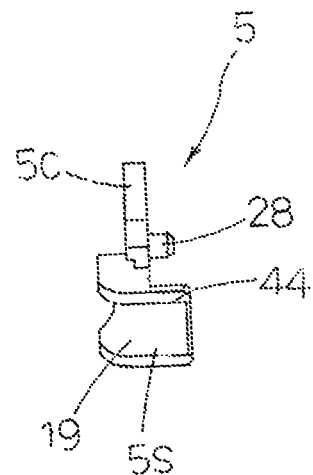
FIG. 14 is a side view showing the spacer of FIG. 13.
Figure 16:
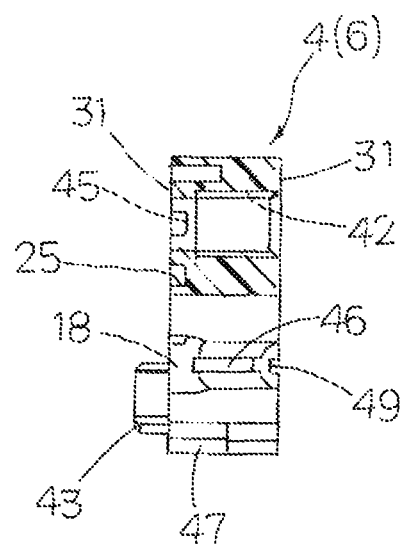
FIG. 16 is a sectional view of the end cap body taken along the line XVI-XVI of FIG. 15.

As shown in FIG. 2, in the present linear motion guide unit, the carriage 3 has threaded holes 27 and positioning holes (not shown) formed in the respective end surfaces 17 thereof. Each end cap 4 has holes 29 formed therein, and each end seal 26 has holes 30 formed therein. Each spacer 5 has positioning projections 28 and lubrication holes 38 formed therein. Each spacer 5 is composed of spacer portions 5S located at positions corresponding to opposite side portions of the carriage 3, and a connecting portion 5C for connecting the opposite spacer portions 5S. The end cap body 6 has semi-cylindrical connection pipe portions 43 (FIGS. 15 and 16) formed therein, and the spacer 5 has semi-cylindrical connection pipe portions 44 formed therein (FIG. 14). The connection pipe portions 43 of the end cap 4 and the connection pipe portions 44 of the spacer 5 are mated with each other to thereby form connection pipes. When the end cap 4 is disposed on the carriage 3, the connection pipes are fitted into the respective return passages 14 of the carriage 3, whereby communication is established between the turnaround passages 15 of the end cap 4 and the return passages 14 of the carriage 3. The end cap body 6 (FIG. 15) has scooping beaks 46 formed at scooping portions for scooping the rolling elements 20 from the load-carrying races 13 and guiding the scooped rolling elements 20 toward the turnaround passages 15. The end cap body 6 also has hook portions 47 formed on its lower surface for attachment of lower-surface seals (not shown).

Figure 3:
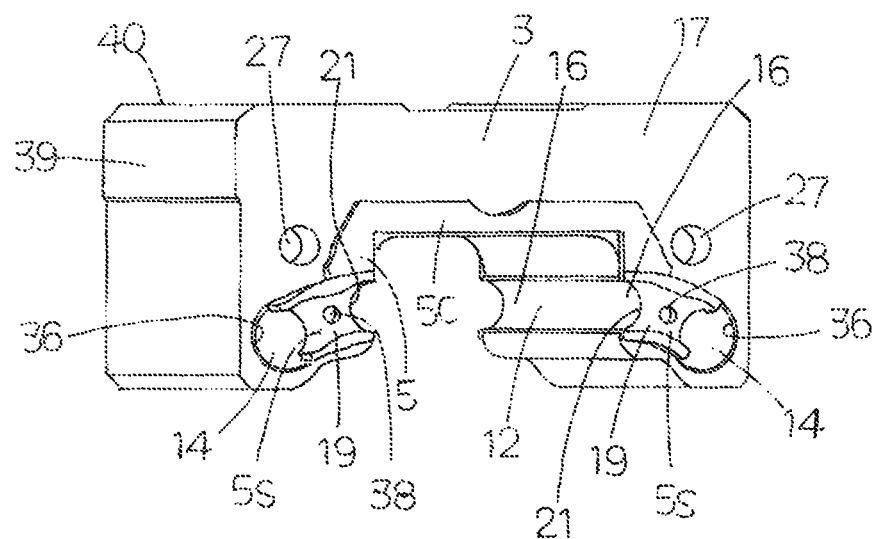
FIG. 3 is a perspective view of the carriage of FIG. 2 viewed from the direction A of FIG. 2.
Figure 4:
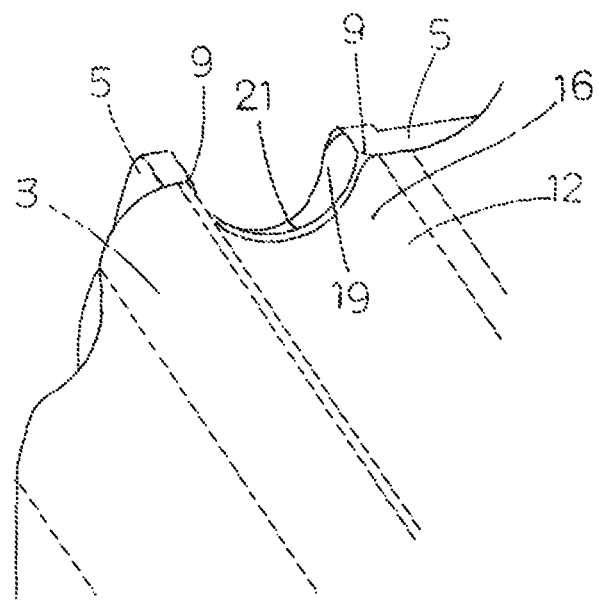
FIG. 4 is a perspective view showing, on an enlarged scale, the carriage of FIG. 3 viewed from the inner part of a load-carrying race.
Figure 5:
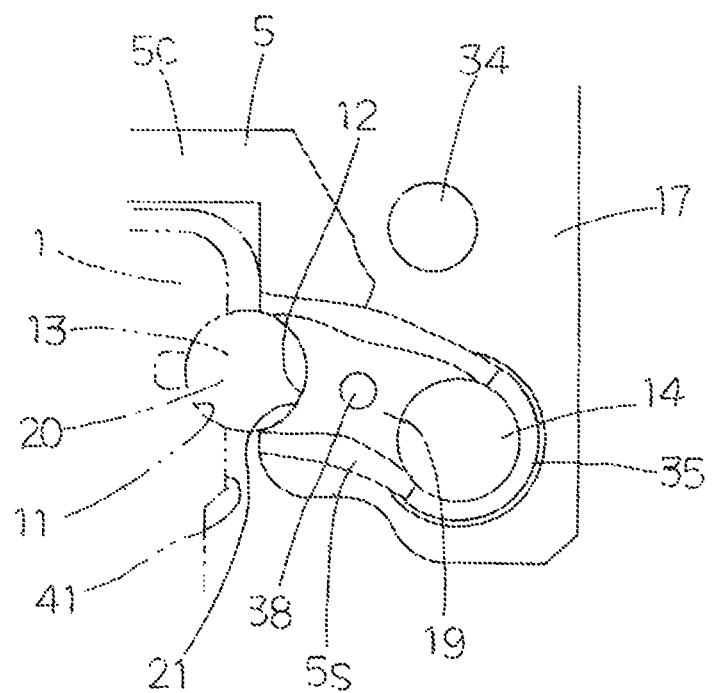
FIG. 5 is an enlarged view showing the right half of the end surface of the carriage of FIG. 2 with the spacer attached to the end surface.
Figure 6:
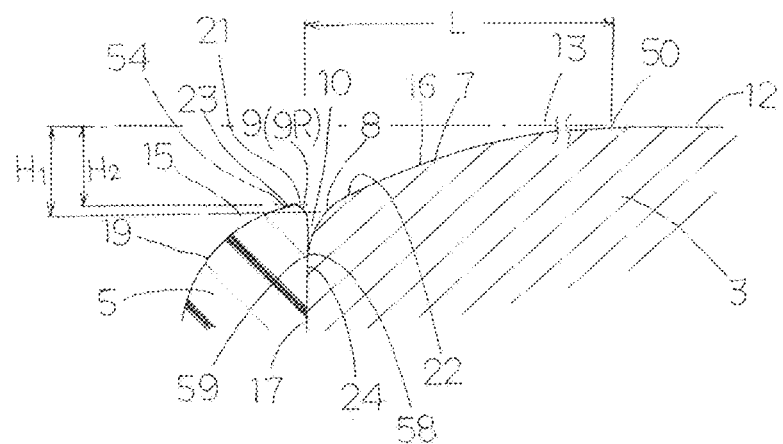

As shown in FIG. 6, in the present linear motion guide unit, a crowning 7 in the form of a curved surface gently curved toward the turnaround passage 15 is formed at opposite ends 16 of the raceway groove 12 of the carriage 3. The crowning 7 and the raceway groove 12 are continuously connected into a single curved surface such that no corner portion is formed at the boundary therebetween; i.e., at a starting point 50 of the crowning 7. In grinding of the carriage 3, the crowning 7 is simultaneously ground from the raceway groove 12 by the creep feed grinding method such that the boundary between the raceway groove 12 and the crowning 7 is on the single curved surface. In the present linear motion guide unit, the crowning 7 partially constitutes a raceway surface for the rolling elements 20. As shown in FIG. 3, the carriage 3 has a mounting surface 40 formed on its upper surface and serving as a reference for mounting a counter member, and a reference plane 39 formed on its side and serving as a reference for mounting the counter member. As shown in FIG. 1, the slider 2 partially constituting the present linear motion guide unit is assembled as follows: the end caps 4 are disposed on the respective end surfaces 17 of the carriage 3; the end seals 26 are disposed on respective end surfaces 31 of the end caps 4; and in this condition, fastening screws 32 are inserted through the respective holes 30 of the end seals 26 and the respective holes 29 of the end caps 4 and are then screwed into the respective threaded holes 27 of the carriage 3 to thereby fix the end caps 4 and the end seals 26 to the carriage 3. The end caps 4 can be disposed in position on the carriage 3 as follows: the spacers 5 to be fitted into the respective recesses 25 of the end cap bodies 6 (FIGS. 15 and 16) are attached to the carriage 3 by fitting the positioning projections 28 of the spacers 5 (FIGS. 13 and 14) into the respective above-mentioned positioning holes of the carriage 3. The guide rail 1 has holes 33 formed in its upper surface for attachment to equipment such as a base. The carriage 3 has threaded holes 34 formed in its upper surface for mounting thereon the counter member or the like. As shown in FIG. 1, the rolling elements 20 are held to the carriage 3 by holding bands 48 fixed in respective recesses 49 of the end cap bodies 6. The carriage 3 has insertion holes 36 into which sleeves 35 for forming the return passages 14 are inserted respectively. The sleeves 35 are lubrication members formed of a porous sintered resin impregnated with lubricant. Grease nipples 37 for supplying lubricant are provided on the respective end surfaces of the end seals 26. The grease nipples 37 are screwed into respective threaded holes 42 formed in the end caps 4. Lubricant is supplied from the grease nipples 37 to the rolling elements 20 through lubrication holes 45 of the end caps 4.

As shown in FIG. 6, in the linear motion guide unit according to the present invention, R chamfered portions 8 are formed from respective starting points 22 located on the distal end side of the crownings 7 formed at the opposite ends 16 of the carriage 3. The R chamfered portion 8 and the crowning 7 are continuously connected in the form of a curved surface having no corner portion. In manufacture of the present linear motion guide unit, a dedicated machine using polishing tape for ultraprecision finish is used for polishing the R chamfered portion 8 with ultra-high precision such that the R chamfered portion 8 is mirror-finished so as to exhibit surface roughness equivalent to or lower than that of the crowning 7. In a conventional linear motion guide unit, when the rolling elements 20 circulate at high speed, impact increases, so that corner portions 58 of end surfaces at the opposite ends 16 of the raceway groove 12 of the carriage 3 are damaged, resulting in shortening of service life. In the present linear motion guide unit, the R chamfered portion 8 is mirror-finished such that the R chamfered portion 8 exhibits surface roughness equivalent to or lower than that of the raceway groove 12, whereby an impact force of the rolling elements 20 is mitigated; thus, damage can be restrained even in use at high speed. The starting point 22 of the R chamfered portion 8 coincides with the end of the crowning 7. An R chamfered portion 9 of the spacer 5 extends from a top 54 of the spacer 5 to a corner portion 58 of an end surface 24 of the spacer 5. The corner portion 58 of the end surface 24 of the spacer 5 faces an intersection point 59 of the R chamfered portion 8 and the end surface 17 of the carriage 3. The R chamfered portion 8 and the R chamfered portion 9 define a valley portion 10 between the facing surfaces of the carriage 3 and the spacer 5. In relative reciprocating movement of the rolling elements 20 as a result of relative sliding of the slider 2, in the case where the rolling elements 20 roll from the load-carrying race 13 to the turnaround passage 15 at such a high speed that the rolling elements 20 move linearly over the crowning 7 by the action of an inertial force, the rolling elements 20 pass above the valley portion 10 and enter the turnaround passage 15 without contact with the crowning 7 and the chamfered portion 9 of the spacer 5. In the case where the rolling elements 20 move at such a low speed as possibly not to move linearly over the crowning 7 by the action of an inertial force, the rolling elements 20 may possibly come into contact with the crowning 7 and with the vicinity of a starting point 23 of the chamfered portion 9 of the spacer 5, and roll such that a spherical surface 51 of each rolling element 20 bridges over the valley portion 10. In the present embodiment, the starting point 23 of the chamfered portion 9 of the spacer 5 is located at the top 54 of a spacer's portion protruding toward the raceway groove 12 of the carriage 3; thus, when the rolling elements 20 roll at low speed, the rolling elements 20 first come into contact with the starting point 23. In other words, the rolling elements 20 smoothly move in a reciprocating manner such that the spherical surface 51 of each rolling element 20 bridges over the valley portion 10 without being caught in the valley portion 10.

Figure 7:
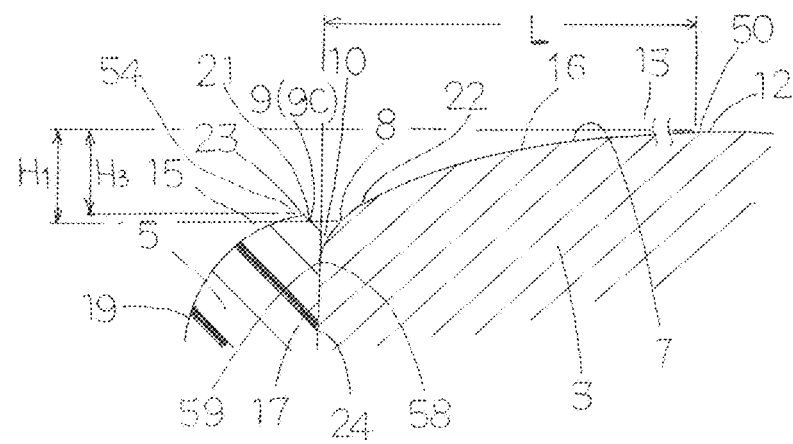
Figure 8:
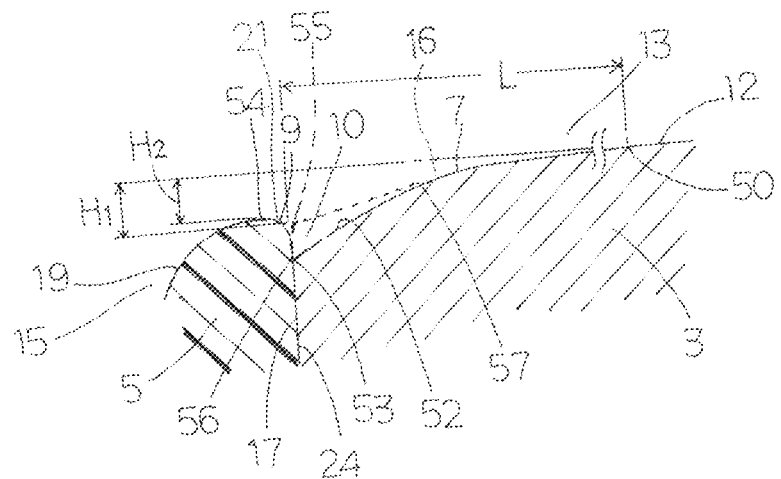

As shown in FIG. 8, R chamfered portions 52 are formed on the distal end side of the crownings 7 formed at the opposite ends 16 of the raceway groove 12 of the carriage 3 while extending from respective distal-end side starting points 57 to the respective end surfaces 17. In FIG. 8, the R chamfered portion 52 is illustrated exaggeratedly; i.e., on an enlarged scale, such that the R chamfered portion 52 extends approximately linearly with respect to the axial direction. The R chamfered portion 52 is mirror-finished as in the case of the R chamfered portion 8. FIG. 6 shows a first embodiment in which the spacer 5 has an R chamfered portion 9R. FIG. 7 shows a second embodiment in which the spacer 5 has a C chamfered portion 9C having the form of an oblique cut C. In the present linear motion guide unit, preferably, the chamfered portion 9 of the spacer 5 is an R chamfered portion. The R chamfered portion 8 of the carriage 3 and the chamfered portion 9 of the spacer 5 will next be described with reference to FIGS. 6 and 7. As shown in FIGS. 6 and 7, the letter L represents the length of the crowning 7 from the starting point 50 of the crowning 7 formed in the carriage 3 to the end surface 17 of the carriage 3. The length L of the crowning 7 is equal to the length of two rolling elements 20, for example. The length from the starting point 50 of the crowning 7 to an intersection point 55 of an imaginary extension line (broken line) of the end surface of the carriage 3 and an imaginary extension line (broken line) of a curved surface of the crowning 7; i.e., a curved surface having a single radius of curvature, is taken as a depth H1 of the crowning 7. The crowning depth H1 is determined to be equivalent to the amount of elastic deformation of the raceway groove 12 of the carriage 3 caused by the rolling elements 20 when half of a basic static rated load of the present linear motion guide unit is imposed. The length from the starting point 50 of the crowning 7 to the starting point 23, or the top, of the chamfered portion 9 of the spacer 5 is taken as a depth H2 (FIG. 6) or H3 (FIG. 7) of the top (highest position) of the spacer. In the present embodiment, the carriage 3 and the spacer 5 are in such a relation that H1 is greater than H2 (H1>H2) and that H1 is greater than H3 (H1>H3). The curved surfaces of the R chamfered portion 8 and the chamfered portion 9 are smaller than the curved surface of each rolling element 20; in other words, the arc surfaces of the R chamfered portion 8 and the chamfered portion 9 are smaller in the radius of curvature than the spherical surface 51 of each rolling element 20. Therefore, each rolling element 20 rolls such that the spherical surface 51 of each rolling element 20 bridges over the valley portion 10 defined by the R chamfered portion 8 and the chamfered portion 9 which face each other.

Figure 6A:
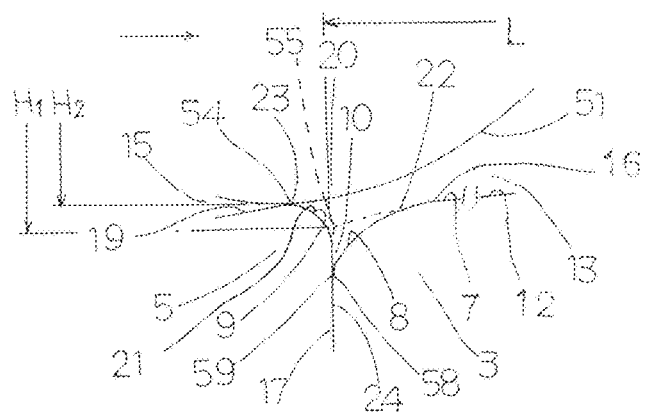
FIG. 6A is an explanatory view showing, on a further enlarged scale, a state that possibly arises when a rolling element rolls from a turnaround passage to the load-carrying race.
Figure 6B:
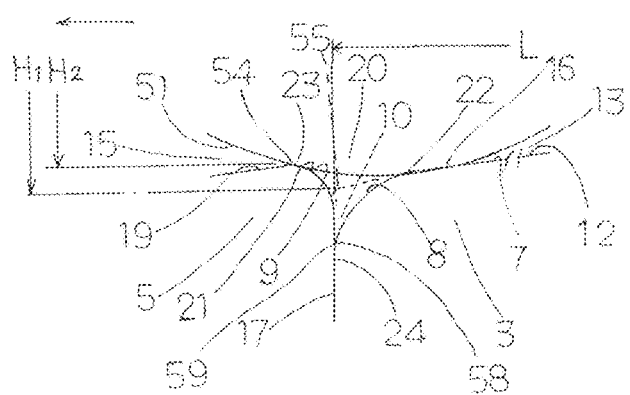
FIG. 6B is an explanatory view showing, on a further enlarged scale, a state that possibly arises when the rolling element rolls from the load-carrying race to the turnaround passage at such a low speed as possibly not to move linearly over the crowning by the action of an inertial force.

As shown in FIG. 6, the chamfered portion 9 of the spacer 5 is in the form of the R chamfered portion 9R, and the R chamfered portion 8 is formed in the carriage 3. The R chamfered portion 8 is mirror-finished such that surface roughness is equivalent to or lower than that of the crowning 7. FIG. 6A shows, on a further enlarged scale, a state that possibly arises when each rolling element 20 rolls from the turnaround passage 15 to the load-carrying race 13 as a result of relative sliding of the slider 2. The spherical surface 51 of each rolling element 20 may possibly come into contact with the starting point 23 of the chamfered portion 9, or the top of the spacer 5; however, the spacer 5 is not damaged, and the spherical surface 51 of each rolling element 20 bridges over the valley portion 10 defined by the chamfered portion 9 of the spacer 5 and the R chamfered portion 8 of the carriage 3 between their facing surfaces, whereby collision against the corner portion 58 of the end surface 17 of the carriage 3 can be prevented. The corner portion 58 of the carriage is the intersection point of the R chamfered portion 8 and the end surface 17 of the carriage 3. As shown in FIG. 6A, in the case where the rolling direction; i.e., the moving direction, of the rolling elements 20 is from the turnaround passage 15 to the load-carrying race 13, since the spherical surface 51 of each rolling element 20 is larger than the arc surfaces of the R chamfered portion 8 and the R chamfered portion 9R, the spherical surface 51 of each rolling element 20 bridges over the valley portion 10 between the R chamfered portion 8 and the R chamfered portion 9R and comes into contact with the crowning 7 of the carriage 3. Therefore, damage to the corner portion 58 of the end surface 17 of the carriage 3 can be restrained. FIG. 6B shows a case in which the rolling element 20 rolls from the load-carrying race 13 to the turnaround passage 15 at such a low speed as possibly not to move linearly over the crowning 7 by the action of an inertial force. When the spherical surface 51 of each rolling element 20 is in contact with the starting point 22 of the R chamfered portion 8 of the carriage 3, the spherical surface 51 of each rolling element 20 may also be in contact with the starting point 23 of the R chamfered portion 9R, or the top of the spacer 5; however, the spacer 5 is not damaged, and the spherical surface 51 of each rolling element 20 bridges over the valley portion 10 defined by the R chamfered portion 9R of the spacer 5 and the R chamfered portion 8 of the carriage 3 between their facing surfaces to thereby be prevented from colliding against the corner portion 58 of the end surface 17 of the carriage 3. As shown in FIG. 6B, in the case where the rolling direction; i.e., the moving direction, of the rolling elements 20 is from the load-carrying race 13 to the turnaround passage 15, the load imposed on the rolling elements 20 is gradually removed along the crowning 7; however, since the rolling elements 20 roll at high speed, the rolling elements 20 move inertially. Since the top 54 of the R chamfered portion 9R of the spacer 5 is located higher than the intersection point 55 of an imaginary extension line (broken line) of the crowning 7 and an imaginary extension line of the end surface 17 of the carriage 3, when each rolling element 20 moves to the crowning 7, each rolling element 20 comes into contact with the starting point 23 of the chamfer of the spacer 5 to thereby be smoothly guided to the turnaround passage 15. Therefore, damage to the corner portion 58 of the end surface 17 of the carriage 3 can be restrained.

Figure 7A:
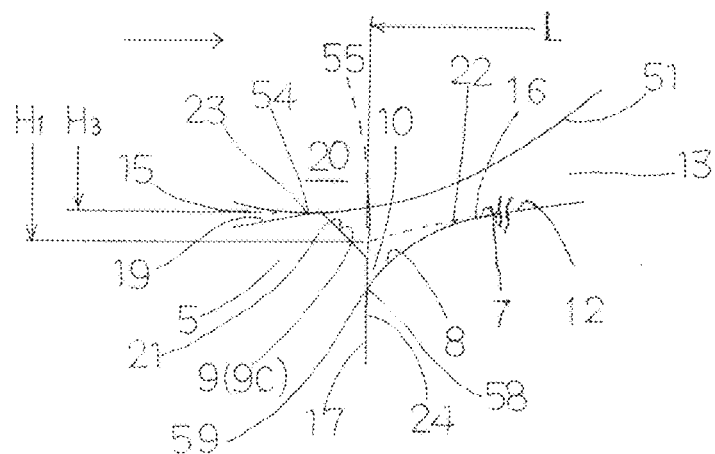
FIG. 7A is an explanatory view showing, on a further enlarged scale, a state that possibly arises when a rolling element rolls from the turnaround passage to the load-carrying race.
Figure 7B:
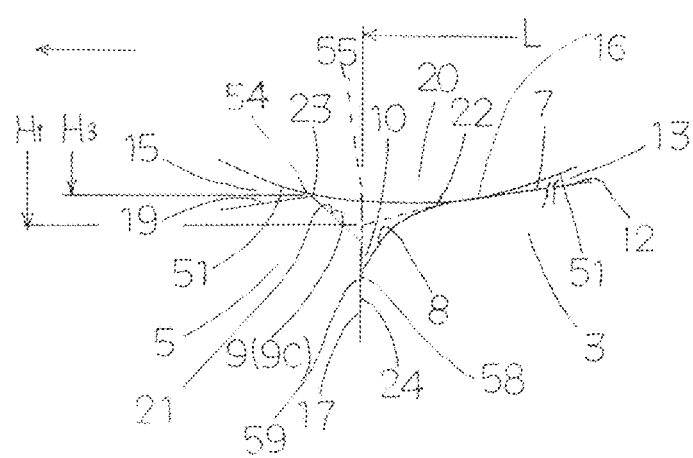
FIG. 7B is an explanatory view showing, on a further enlarged scale, a state that possibly arises when the rolling element rolls from the load-carrying race to the turnaround passage at such a low speed as possibly not to move linearly over the crowning by the action of an inertial force.

As shown in FIG. 7, the chamfered portion 9 of the spacer 5 is in the form of the C chamfered portion 9C, and the R chamfered portion 8 is formed in the carriage 3. The R chamfered portion 8 is mirror-finished such that surface roughness is equivalent to or lower than that of the crowning 7. FIG. 7A shows, on a further enlarged scale, the C chamfered portion 9C of the spacer 5 and a state that possibly arises when each rolling element 20 rolls from the turnaround passage 15 to the load-carrying race 13. The spherical surface 51 of each rolling element 20 may possibly come into contact with the starting point 23 of the C chamfered portion 9C, or the top of the spacer 5; however, the spacer 5 is not damaged, and the spherical surface 51 of each rolling element 20 bridges over the valley portion 10 defined by the C chamfered portion 9C of the spacer 5 and the R chamfered portion 8 of the carriage 3 between their facing surfaces, whereby collision against the corner portion 58 of the end surface 17 of the carriage 3 can be prevented. As shown in FIG. 7A, a state that possibly arises when the rolling direction; i.e., the moving direction, of the rolling elements 20 is from the turnaround passage 15 to the load-carrying race 13, is similar to the state shown in FIG. 6A. Therefore, damage to the corner portion 58 of the end surface 17 of the carriage 3 can be restrained. FIG. 7A shows a case in which the rolling element 20 rolls from the load-carrying race 13 to the turnaround passage 15 at such a low speed as possibly not to move linearly over the crowning 7 by the action of an inertial force. As shown in FIG. 7B, the top 54 of the spacer 5, or the starting point 23 of the C chamfered portion 9C, is located higher than the intersection point 55 of an imaginary extension line (broken line) of the crowning 7 and an imaginary extension line of the end surface 17 of the carriage 3; when the spherical surface 51 of each rolling element 20 is in contact with the starting point 22 of the R chamfered portion 8 of the carriage 3, similar to the case shown in FIG. 6B, the spherical surface 51 of each rolling element 20 may also be in contact with the starting point 23 of the R chamfered portion 9C, or the top 54 of the spacer 5; however, the spacer 5 is not damaged since the rolling element speed is low, and the spherical surface 51 of each rolling element 20 bridges over the valley portion 10 defined by the C chamfered portion 9C of the spacer 5 and the R chamfered portion 8 of the carriage 3 between their facing surfaces to thereby be prevented from colliding against the corner portion 58 of the end surface 17 of the carriage 3. Therefore, damage to the corner portion 58 of the end surface 17 of the carriage 3 can be restrained.

Figure 8A:
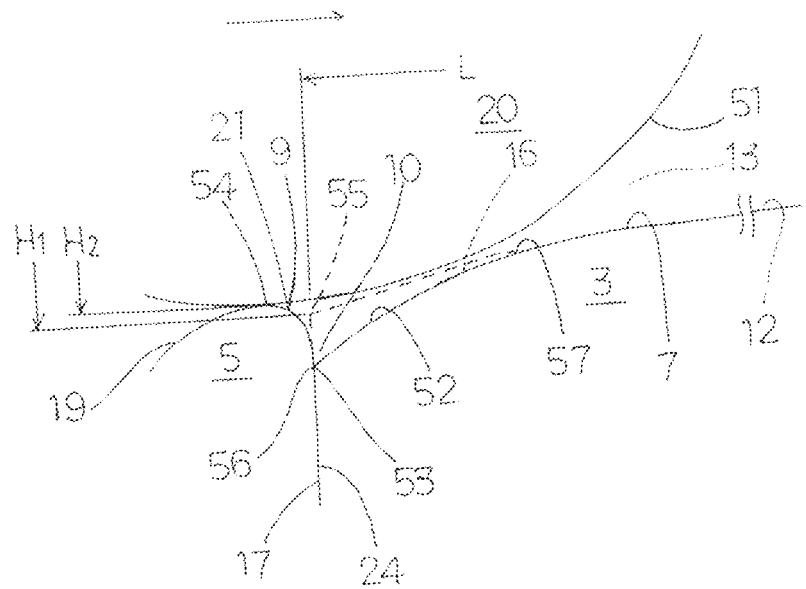
FIG. 8A is an explanatory view showing, on a further enlarged scale, a state that possibly arises when a rolling element rolls from the turnaround passage to the load-carrying race.

FIG. 8 shows a further embodiment, or a third embodiment, of the linear motion guide unit according to the present invention. As shown in FIG. 8, in the present linear motion guide unit, the end cap 4 is disposed on the carriage 3 such that the top 54 of the R chamfered portion 9 of the spacer 5 is located at a position higher than the intersection point 55 of the imaginary extension line (broken line) of the crowning 7 of the carriage 3 and the imaginary extension line (broken line) of the end surface 17 of the carriage 3. At this time, the corner portion 53 of an end portion of the R chamfered portion 52 of the carriage 3 is located at a position lower than the above-mentioned intersection point 55. The corner portion 53 of the carriage 3 is an intersection point 56 of the R chamfered portion 52 and the end surface 17 of the carriage 3. FIG. 8A is an explanatory view showing, on a further enlarged scale, a state that possibly arises when each rolling element 20 rolls from the turnaround passage 15 to the load-carrying race 13. In the third embodiment, in relative reciprocating movement of the rolling elements 20 as a result of relative sliding of the slider 2, in the case where the rolling elements 20 roll from the load-carrying race 13 to the turnaround passage 15 at such a high speed that the rolling elements 20 move linearly over the crowning 7 by the action of an inertial force, the rolling elements 20 pass above the valley portion 10 and enter the turnaround passage 15 without contact with the crowning 7 and the chamfered portion 9 of the spacer 5. In the case where the rolling elements 20 move at such a low speed as possibly not to move linearly over the crowning 7 by the action of an inertial force, the rolling elements 20 roll while bridging over the valley portion 10 formed between the chamfered portion 9 of the spacer 5 and the R chamfered portion 52 of the carriage 3 to thereby be prevented from colliding against the corner portion 53 of the R chamfered portion 52 of the carriage 3, whereby damage to the corner portion 53 can be restrained.

Figure 9:
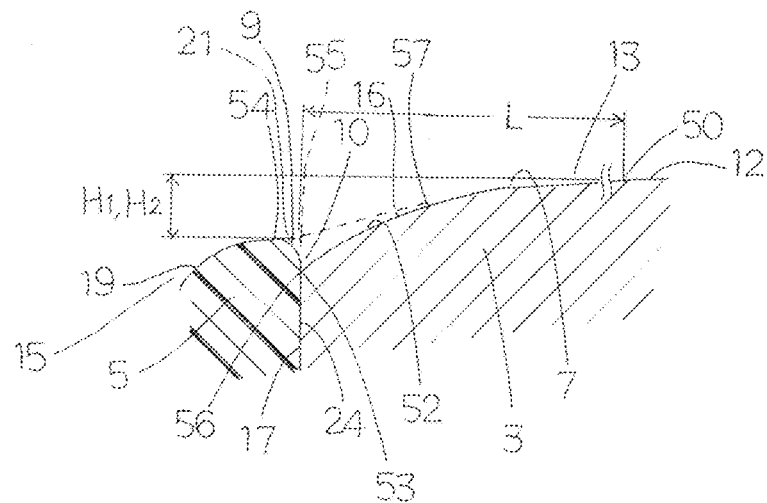
Figure 9A:
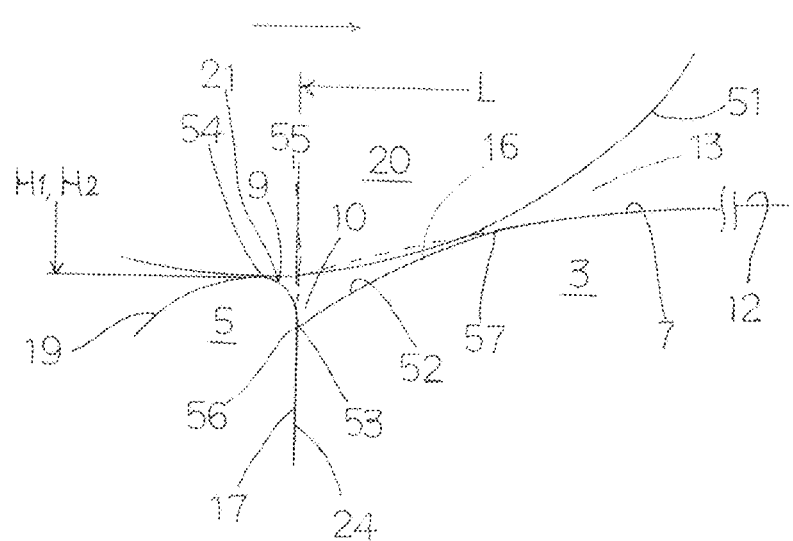

FIG. 9 shows a still further embodiment, or a fourth embodiment, of the linear motion guide unit according to the present invention. As shown in FIG. 9, in the present linear motion guide unit, the end cap 4 is disposed on the carriage 3 such that the top 54 of the R chamfered portion 54 of the spacer 5 is located at the same position as that of the imaginary extension line (broken line) of the crowning 7 of the carriage 3. That is, the top 54 of the chamfered portion 9 of the spacer 5 can be said to be located within a range from the intersection point 55 of the extension line of the crowning 7 of the carriage 3 and the extension line of the end surface 17 of the carriage 3 to the corner portion 53 of the R chamfered portion 52 of the carriage 3. FIG. 9A is an explanatory view showing, on a further enlarged scale, a state that possibly arises when each rolling element 20 rolls from the turnaround passage 15 to the load-carrying race 13. In the fourth embodiment, in relative reciprocating movement of the rolling elements 20 as a result of relative sliding of the slider 2, in the case where the rolling elements 20 roll from the load-carrying race 13 to the turnaround passage 15 at such a high speed that the rolling elements 20 move linearly over the crowning 7 by the action of an inertial force, the rolling elements 20 pass above the valley portion 10 and enter the turnaround passage 15 without contact with the crowning 7 and the chamfered portion 9 of the spacer 5. In the case where the rolling elements 20 move at such a low speed as possibly not to move linearly over the crowning 7 by the action of an inertial force, the rolling elements 20 roll while bridging over the valley portion 10 formed between the chamfered portion 9 of the spacer 5 and the R chamfered portion 52 of the carriage 3 to thereby be prevented from colliding against the corner portion 53 of the R chamfered portion 52 of the carriage 3, whereby damage to the corner portion 53 can be restrained.

Figure 10:
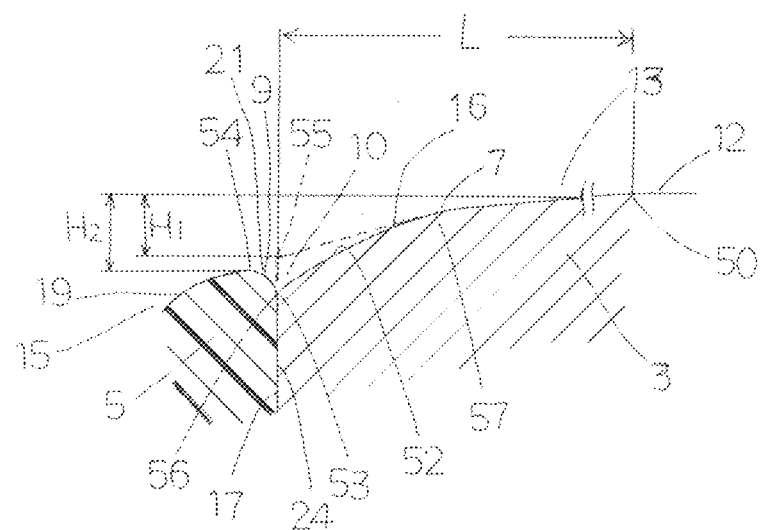
Figure 10A:
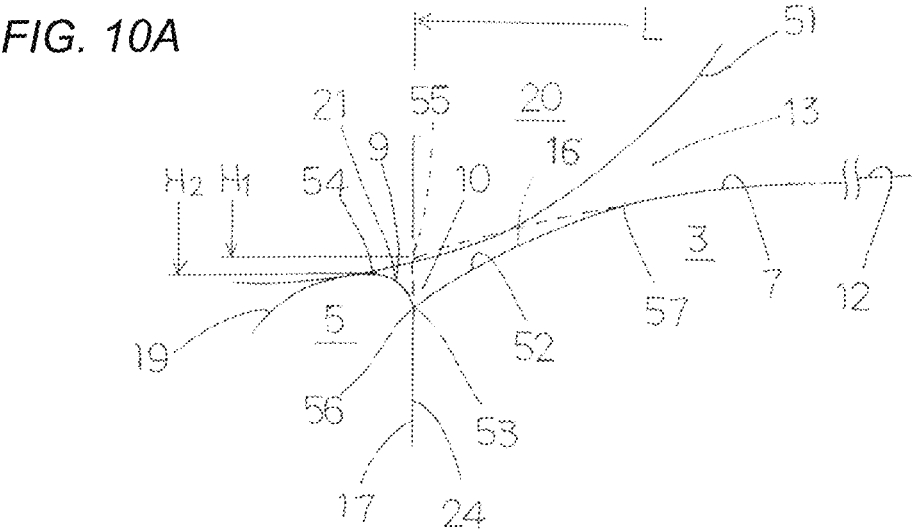
FIG. 10A is an explanatory view showing, on a further enlarged scale, a state that possibly arises when the rolling element rolls from the turnaround passage to the load-carrying race.

FIG. 10 shows yet another embodiment, or a fifth embodiment, of the linear motion guide unit according to the present invention. As shown in FIG. 10, in the fifth embodiment, the end cap 4 is disposed on the carriage 3 such that the top 54 of the R chamfered portion 9 of the spacer 5 is located within a range from the intersection point 55 of the imaginary extension line (broken line) of the crowning 7 and the imaginary extension line (broken line) of the end surface 17 of the carriage 3 to the corner portion 53 of the R chamfered portion 52 of the carriage 3. FIG. 10A is an explanatory view showing, on a further enlarged scale, a state that possibly arises when each rolling element 20 rolls from the turnaround passage 15 to the load-carrying race 13. In the fifth embodiment, in relative reciprocating movement of the rolling elements 20 as a result of relative sliding of the slider 2, in the case where the rolling elements 20 roll from the load-carrying race 13 to the turnaround passage 15 at such a high speed that the rolling elements 20 move linearly over the crowning 7 by the action of an inertial force, the rolling elements 20 pass above the valley portion 10 and enter the turnaround passage 15 without contact with the crowning 7 and the chamfered portion 9 of the spacer 5. In the case where the rolling elements 20 move at such a low speed as possibly not to move linearly over the crowning 7 by the action of an inertial force, the rolling elements 20 roll while bridging over the valley portion 10 formed between the chamfered portion 9 of the spacer 5 and the R chamfered portion 52 of the carriage 3 to thereby be prevented from colliding against the corner portion 53 of the R chamfered portion 52 of the carriage 3, whereby damage to the corner portion 53 can be restrained.

Figure 11:
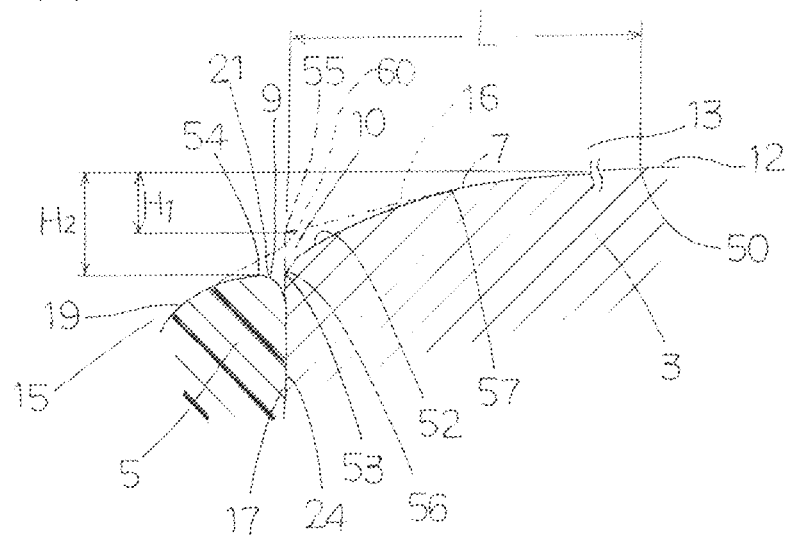
Figure 11A:
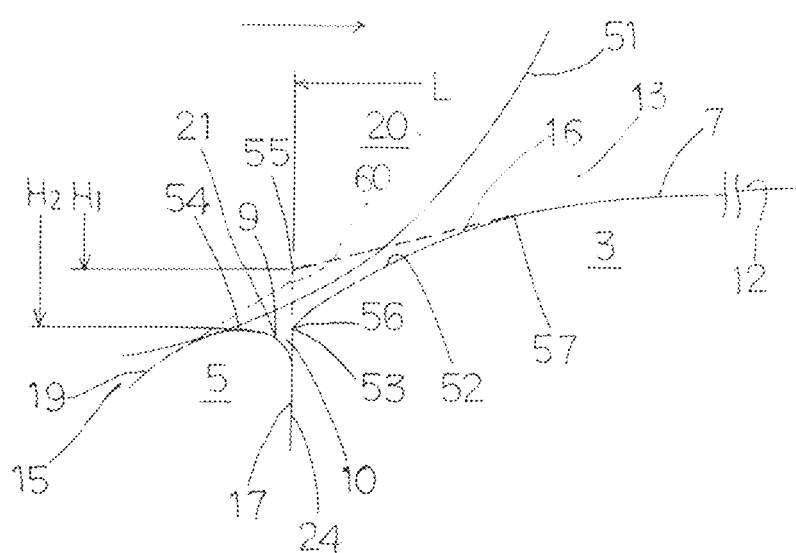
FIG. 11A is an explanatory view showing, on a further enlarged scale, a state that possibly arises when the rolling element rolls from the turnaround passage to the load-carrying race.

FIG. 11 shows another embodiment, or a sixth embodiment, of the linear motion guide unit according to the present invention. As shown in FIG. 11, in the sixth embodiment, the end cap 4 is disposed on the carriage 3 such that the top 54 of the R chamfered portion 9 of the spacer 5 is located at the same position as that of the corner portion 53 of the R chamfered portion 52 of the carriage 3 and such that an intersection point 60 of an imaginary extension line (broken line) of the inner circumferential surface 19 of the spacer 5 and an imaginary extension line of the end surface 24 of the spacer 5 is located within a range from the corner portion 53 of an end portion of the R chamfered portion 52 of the carriage 3 to the intersection point 55 of the imaginary extension line (broken line) of the crowning 7 and the imaginary extension line (broken line) of the end surface 17 of the carriage 3. FIG. 11A is an explanatory view showing, on a further enlarged scale, a state that possibly arises when each rolling element 20 rolls from the turnaround passage 15 to the load-carrying race 13. In the sixth embodiment, in relative reciprocating movement of the rolling elements 20 as a result of relative movement of the slider 2, in the case where the rolling elements 20 roll from the load-carrying race 13 to the turnaround passage 15 at such a high speed that the rolling elements 20 move linearly over the crowning 7 by the action of an inertial force, the rolling elements 20 pass above the valley portion 10 and enter the turnaround passage 15 without contact with the crowning 7 and the chamfered portion 9 of the spacer 5. In the case where the rolling elements 20 move at such a low speed as possibly not to move linearly over the crowning 7 by the action of an inertial force, the rolling elements 20 roll while bridging over the valley portion 10 formed between the chamfered portion 9 of the spacer 5 and the R chamfered portion 52 of the carriage 3 to thereby be prevented from colliding against the corner portion 53 of the R chamfered portion 52 of the carriage 3, whereby damage to the corner portion 53 can be restrained.

Figure 12:
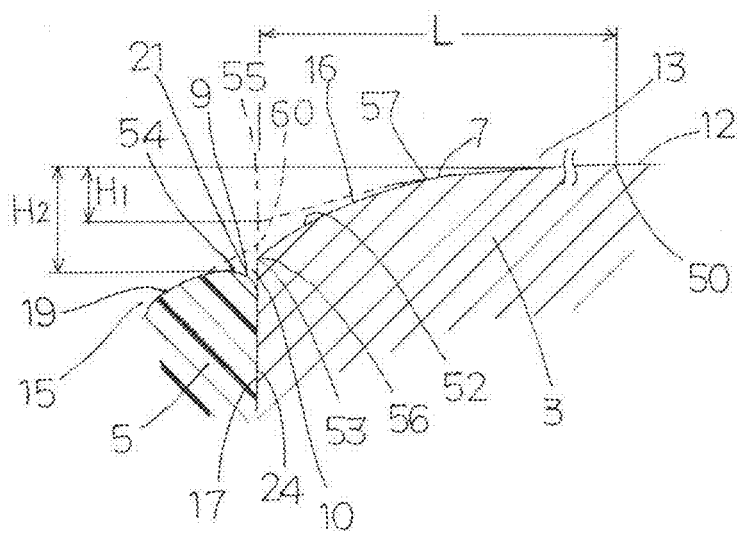
Figure 12A:
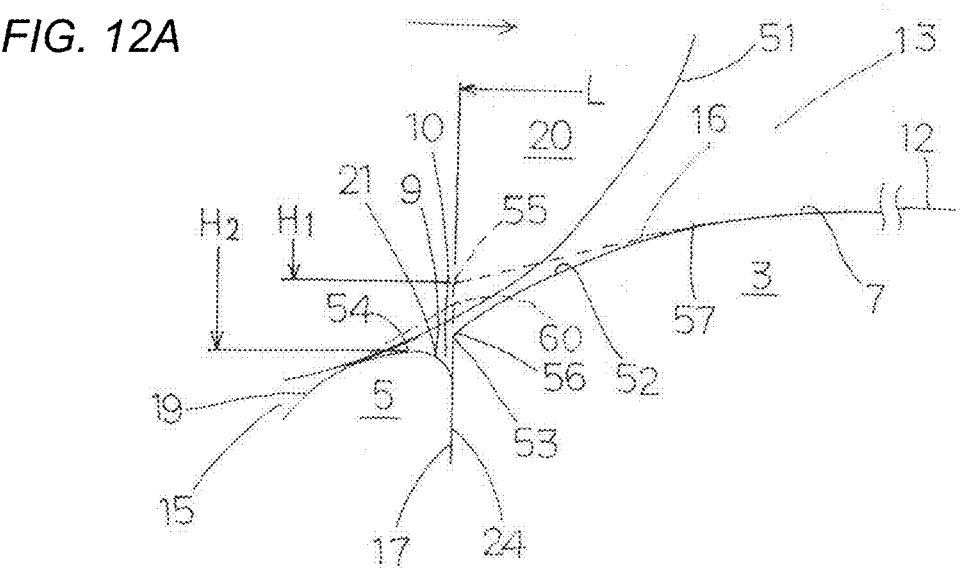
FIG. 12A is an explanatory view showing, on a further enlarged scale, a state that possibly arises when the rolling element rolls from the turnaround passage to the load-carrying race.

FIG. 12 shows a further embodiment, or a seventh embodiment, of the linear motion guide unit according to the present invention. In the seventh embodiment, the end cap 4 is disposed on the carriage 3 such that the top 54 of the R chamfered portion 9 of the spacer 5 is located lower than the corner portion 53 of the R chamfered portion 52 of the carriage 3 and such that the intersection point 60 of an imaginary extension line (broken line) of the inner circumferential surface 19 of the spacer 5 and an imaginary extension line of the end surface 24 of the spacer 5 is located higher than the corner portion 53 of the carriage 3. FIG. 12A is an explanatory view showing, on a further enlarged scale, a state that possibly arises when each rolling element 20 rolls from the turnaround passage 15 to the load-carrying race 13. In the seventh embodiment, in relative reciprocating movement of the rolling elements 20 as a result of relative movement of the slider 2, in the case where the rolling elements 20 roll from the load-carrying race 13 to the turnaround passage 15 at such a high speed that the rolling elements 20 move linearly over the crowning 7 by the action of an inertial force, the rolling elements 20 pass above the valley portion 10 and enter the turnaround passage 15 without contact with the crowning 7 and the chamfered portion 9 of the spacer 5. In the case where the rolling elements 20 move at such a low speed as possibly not to move linearly over the crowning 7 by the action of an inertial force, the rolling elements 20 roll while bridging over the valley portion 10 formed between the chamfered portion 9 of the spacer 5 and the R chamfered portion 52 of the carriage 3 to thereby be prevented from colliding against the corner portion 53 of the R chamfered portion 52 of the carriage 3, whereby damage to the corner portion 53 can be restrained.

In the present linear motion guide unit, an end portion 21 which partially constitutes the inner circumferential surface 19 of the turnaround passage 15 of the spacer 5 protrudes from an imaginary extension line (broken line) of the crowning 7 of the carriage 3. Specifically, in FIGS. 6 and 7, the starting point 23 of the R or C chamfered portion 9 of the spacer 5 is located higher than the intersection point 55 of the imaginary extension line (broken line) of the crowning 7 of the carriage 3 and the imaginary extension line (broken line) of the end surface 17 of the carriage 3; however, the starting point 23 may be located lower than the intersection point 55 (not shown) or located at the same height as that of the intersection point 55 (not shown) so long as the rolling elements 20, or the rolling elements, can roll while bridging over the valley portion 10. In FIGS. 6 and 7, the end surface 24 at which the chamfered portion 9 of the spacer 5 terminates protrudes from; i.e., is higher than, the end surface 17 at which the R chamfered portion 8 of the carriage 3 terminates; however, the end surface 24 may be lower than the end surface 17 (not shown) or at the same height as that of the end surface 17 (not shown) so long as the rolling elements 20, or the rolling elements, can roll while bridging over the valley portion 10. Therefore, in the present linear motion guide unit, dimensional accuracy in mounting the spacer 5 to the carriage 3 is not necessarily high; instead, the valley portion 10 is formed between their facing surfaces, thereby facilitating dimensional management.

In the present linear motion guide unit, the crowning 7 of the carriage 3 is finished by grinding, and the R chamfered portion 8 or 52 of the carriage 3 is mirror-finished by use of polishing tape. The R chamfered portion 8 or 52 and the crowning 7 are continuously connected in the form of a curved surface having no corner portion. In the present linear motion guide unit, in the case where the rolling elements 20 roll from the load-carrying race 13 to the turnaround passage 15, the rolling elements 20 roll linearly by the action of inertia force; the rolling elements 20 roll while the load imposed on the rolling elements 20 is gradually removed along the crowning 7; and the rolling elements 20 pass above the valley portion 10 formed between the chamfered portion 9 of the spacer 5 and the R chamfered portion 8 or 52 of the carriage 3 and enter the turnaround passage 15 without contact with the vicinity of the top 54 of the chamfered portion 9 of the spacer 5 while being guided by the outer circumferential surface 18 of the end cap body 6. The present linear motion guide unit is intended for high-speed applications, so the following phenomenon rarely occurs; however, in the case where the rolling elements 20 roll at low speed from the load-carrying race 13 to the turnaround passage 15, similar to the case of high-speed rolling, the rolling elements 20 roll linearly while the load imposed on the rolling elements 20 is gradually removed along the crowning 7; then, the rolling elements 20 roll while bridging over the valley portion 10 formed between the R chamfered portion 8 or 52 and the R chamfered portion 9; and the rolling elements 20 roll in contact with the chamfered portion 9 of the spacer 5 and then roll in the turnaround passage 15 while being guided by the inner circumferential surface 19.

In the present linear motion guide unit, in the case where the rolling elements 20 roll at high speed from the turnaround passage 15 to the load-carrying race 13, the rolling elements 20 roll in the turnaround passage 15 while being in contact with and along the outer circumferential surface 18 of the end cap body 6 with centrifugal force imposed thereon; then, the rolling elements 20 pass above the valley portion 10 and roll in contact with the crowning 7 while the load is gradually imposed thereon. The present linear motion guide unit is intended for high-speed applications, so the following state rarely occurs; however, in the case where the rolling elements 20 roll at low speed from the turnaround passage 15 to the load-carrying race 13, the rolling elements 20 roll in the turnaround passage 15; then, the rolling elements 20 roll while bridging over the valley portion 10 and then roll to the crowning 7 or to the R chamfered portion 8 or 52 in the vicinity of the crowning 7. In the present linear motion guide unit, the longitudinal section of the raceway groove 12 at the R chamfered portion 8 or 52 has a convexly curved shape, whereas the section of the raceway groove 12 taken perpendicularly to the longitudinal direction has a semicircular curve. The R chamfered portions 8 and 52 are formed in such a manner as to wrap the rolling elements 20 so as to serve as the surfaces for receiving impact of the rolling elements 20. As compared with the corner portions 53 and 58, the R chamfered portions 8 and 52 are large in contact area in the event of collision of the rolling elements 20 and thus yield the effect of lowering contact pressure in the event of collision of the rolling elements 20 and thus mitigating stress concentration. Further, the R chamfered portions 8 and 52 are mirror-finished such that the R chamfered portions 8 and 52 exhibit surface roughness equivalent to or lower than that of the raceway groove 12, whereby an impact force of the rolling elements 20 is mitigated, and thus durability is enhanced. In the present linear motion guide unit, even in use at high speed, damage to the corner portion 53 or 58 of the end surface 17 of the carriage 3 can be restrained.

What is claimed is:

1. A linear motion guide unit comprising:
    a guide rail having a first raceway groove extending along a longitudinal direction, and
    a slider which has a second raceway groove facing the first raceway groove and slides in relation to the guide rail via a plurality of rolling elements serving as rolling elements and rolling in a load-carrying race composed of the first raceway groove and the second raceway groove,
    the slider having a carriage in which the second raceway groove and a return passage extending in parallel with the second raceway groove are formed, and end caps which are disposed in close contact with respective opposite end surfaces of the carriage and in which arc turnaround passages are formed respectively and establish communication between the load-carrying race and the return passage,
    each of the end caps comprising an end cap body which forms an outer circumferential surface of the turnaround passage, and a spacer which is disposed in a recess of the end cap body and forms an inner circumferential surface of the turnaround passage, and
    crownings being formed at respective opposite ends of the second raceway groove of the carriage and each having the form of a curved surface curved toward the turnaround passage,
    wherein at least a chamfered portion is formed at a corner portion of an end surface of the spacer, wherein the end surface of the spacer faces the end surface of the carriage,
    on a distal end side of each of the crownings, the carriage has an R chamfered portion sloped more steeply than the crowning, and the crowning and the R chamfered portion are connected continuously without formation of a corner portion,
    the chamfered portion of the spacer and the R chamfered portion of the carriage define a valley portion between mutually facing surfaces of the carriage and the spacer, and
    the rolling elements roll above the valley portion while striding the valley portion.

2. The linear motion guide unit according to claim 1, wherein an intersection point of an imaginary line extending along the inner circumferential surface of the turnaround passage of the spacer and an imaginary line extending along the end surface of the spacer is located in a region higher than a corner portion of the end surface of the carriage.

3. The linear motion guide unit according to claim 2, wherein a top of the chamfered portion of the spacer is located in a region lower than the corner portion of the end surface of the carriage.

4. The linear motion guide unit according to claim 1, wherein a top of the chamfered portion of the spacer is located in a region higher than an intersection point of an extension line of the crowning of the carriage and an extension line of the end surface of the carriage.

5. The linear motion guide unit according to claim 1, wherein a top of the chamfered portion of the spacer is located within a range from an intersection point of an extension line of the crowning of the carriage and an extension line of the end surface of the carriage to a corner portion of the end surface of the carriage.

6. The linear motion guide unit according to claim 1, wherein the chamfered portion of the spacer is an R chamfered portion.

7. The linear motion guide unit according to claim 1, wherein the crownings of the carriage are finished by grinding, and the R chamfered portions of the carriage are mirror-finished by use of polishing tape.

\* \* \* \* \*